(12) United States Patent
Longhurst

(10) Patent No.: US 12,284,413 B2
(45) Date of Patent: Apr. 22, 2025

(54) STREAM REGION REPLACEMENTS

(71) Applicant: Teradici Co., Burnaby (CA)

(72) Inventor: Peter William Longhurst, Vancouver (CA)

(73) Assignee: Teradici Co., Burnaby (CA)

( * ) Notice: Subject to any disclaimer, the term of this patent is extended or adjusted under 35 U.S.C. 154(b) by 190 days.

(21) Appl. No.: 17/845,768

(22) Filed: Jun. 21, 2022

(65) Prior Publication Data

US 2023/0412872 A1     Dec. 21, 2023

(51) Int. Cl.
*H04N 21/44* (2011.01)
*H04N 21/433* (2011.01)
*H04N 21/443* (2011.01)

(52) U.S. Cl.
CPC ... *H04N 21/4331* (2013.01); *H04N 21/44008* (2013.01); *H04N 21/443* (2013.01)

(58) Field of Classification Search
CPC .......... H04N 21/443; H04N 21/44008; H04N 21/4331

USPC ........................................................... 725/95
See application file for complete search history.

(56) References Cited

U.S. PATENT DOCUMENTS

| | | | |
|---|---|---|---|
| 11,444,982 B1* | 9/2022 | Slotznick | G06T 3/02 |
| 2013/0235224 A1* | 9/2013 | Park | H04N 23/64 |
| | | | 348/E5.024 |
| 2015/0181265 A1* | 6/2015 | Clavenna | H04N 21/2187 |
| | | | 348/159 |
| 2022/0036495 A1* | 2/2022 | Reed | G06T 1/0028 |
| 2022/0262326 A1* | 8/2022 | Sommerlade | G06V 40/161 |
| 2022/0365663 A1* | 11/2022 | Baribault | G06F 3/0304 |
| 2024/0121358 A1* | 4/2024 | Wang | G06T 7/20 |

* cited by examiner

*Primary Examiner* — Alfonso Castro
(74) *Attorney, Agent, or Firm* — Quarles & Brady LLP

(57) ABSTRACT

Examples of methods are described. In some examples, a method includes sending a video feed from a client device to a host device. In some examples, the method includes receiving a stream from the host device. In some examples, the stream includes a region based on the video feed. In some examples, the method includes replacing the region with the video feed.

20 Claims, 4 Drawing Sheets

STREAM REGION REPLACEMENTS

BACKGROUND

The use of electronic devices has expanded. Computing devices are a kind of electronic device that include electronic circuitry for performing processing. As processing capabilities have expanded, computing devices have been utilized to perform more functions. For example, a variety of computing devices are used for work, communication, and entertainment. Computing devices may be linked to a network to facilitate communication between computing devices.

DETAILED DESCRIPTION

Figure 1:
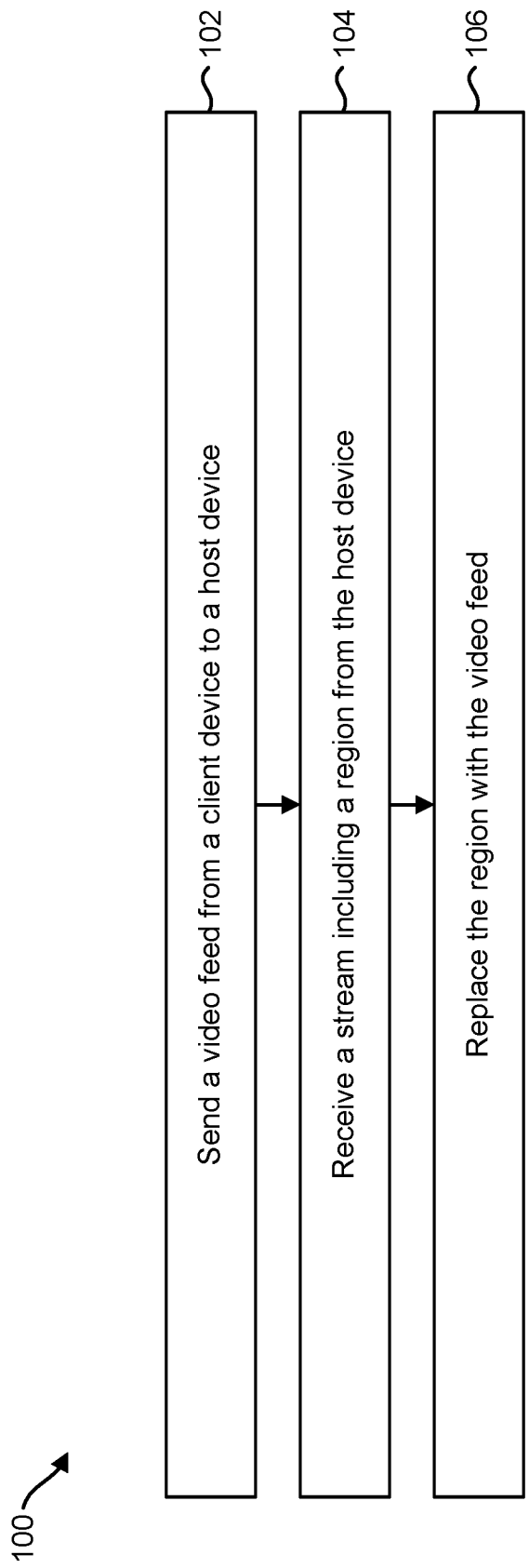
FIG. 1 is a flow diagram illustrating an example of a method for stream region replacement.

In some approaches for video conferencing in a virtualized operating environment, a client video feed is sent to a host device. The host device may render a view of the video feed and send the view back to a client device as part of the image to be displayed by the client device. Some examples of the techniques described herein enhance the virtualized operating environment performance when a portion of the image sent from the host device includes a view of a video feed that is sourced from the client device. For instance, the remotely rendered view may be replaced by the video feed at the client device, which may provide lower latency and/or higher image quality.

An operating environment is a program that provides an interactive interface. For instance, a program may be executed on a computing device to provide an operating environment, which may allow interaction with the computing device (e.g., launching an application, displaying media, utilizing a productivity application, etc.). Examples of operating environments include Microsoft Windows® (e.g., Windows 7, Windows 10, Windows 11, etc.), Unix®, Linux®, macOS®, iOS®, Android™, etc.

A virtualized operating environment is an operating environment that is provided from a host device. For example, a virtualized operating environment may be hosted by a host device (e.g., remote computing device) and/or a stream (e.g., images, frames, etc.) of an interactive interface of a virtualized operating environment may be transmitted to a client device (e.g., local computing device) from the host device via a network(s). For instance, a virtualized operating environment may be transmitted to a client device by providing an interactive interface of the virtualized operating environment over a network. In some examples, the term "remote" may denote that an item is separate from another item, is connected to another item across a network or networks, is in a different area (e.g., room, building, etc.) than another item, and/or is located beyond a distance (e.g., one inch, one foot, one meter, one mile, etc.) from another item.

In some examples, a virtualized operating environment may be provided over a network(s) using a protocol(s). Examples of protocols that may be utilized to provide a virtualized operating environment may include Personal Computer over Internet Protocol (PCoIP), Remote Desktop Protocol (RDP), Independent Computing Architecture (ICA) protocol, Remote Frame Buffer (RFB) protocol, etc. In some examples, an input or inputs obtained at a client device may be sent to a host device. Examples of an input may include a video feed (e.g., frames from an image sensor, camera, web cam, etc.), cursor input (e.g., input from a mouse, touchpad, and/or touchscreen, etc.), keyboard input, etc. The host device may render a stream (e.g., images, frames, etc.) of the virtualized operating environment and may send the stream to the client device. In some examples, the host device may compress the stream.

An electronic device is a device that includes electronic circuitry (e.g., integrated circuitry, etc.). A computing device is an electronic device that includes a processor and/or logic circuitry. Examples of computing devices may include desktop computers, laptop computers, servers, tablet devices, smartphones, tablet device, televisions, game consoles, smart speakers, voice assistants, etc. A computing device may utilize processor(s) and/or logic circuitry to perform an operation or operations. In some examples, computing devices may execute instructions stored in memory to perform the operation(s). Instructions may be code and/or programming that specifies functionality or operation of the circuitry. In some examples, instructions may be stored in memory (e.g., Random Access Memory (RAM), Dynamic Random Access Memory (DRAM), magnetoresistive random-access memory (MRAM), phase change RAM (PCRAM), memristor, non-volatile memory, Read-Only Memory (ROM), Erasable Programmable Read-Only Memory (EPROM), Electrically Erasable Programmable Read-Only Memory (EEPROM), flash memory, volatile memory, etc.).

In some examples, a computing device may be linked to another electronic device or devices using a wired and/or wireless link. For example, a computing device may include a communication interface for linking to an electronic device (e.g., switch, router, server, and/or computer, etc.). Examples of wired communication interfaces may include an Ethernet interface, Universal Serial Bus (USB) interface, fiber interface, Lightning® interface, etc. In some examples, a computing device may include a wireless communication interface to send and/or receive wireless (e.g., radio frequency (RF)) signals. Examples of wireless communication interfaces may include an Institute of Electrical and Electronics Engineers (IEEE®) 802.11 (WI-FI®) interface, Bluetooth® interface, cellular (e.g., 3G, Long-Term Evolution (LTE®), 4G, 5G, etc.) interface, etc.

A link between electronic devices may be a direct link (e.g., without an intervening device) or an indirect link (e.g., with an intervening device or devices). For instance, a link may be established between electronic devices over a network using a modem(s), router(s), switch(es), hub(s), and/or repeater(s), etc.

A client device is an electronic device capable of receiving communications from a remote device (e.g., host device). For instance, a client device may request and/or receive data, services, etc., from a host device over a network(s) (e.g., Local Area Network (LAN), Wide Area Network (WAN), and/or the Internet, etc.). A host device is an electronic device capable of sending communications to a client device. For instance, a host device may send data, services, etc., to a client device over a network(s). In some examples, a host device may be a server and a client device may be an end-user device (e.g., laptop computer, desktop computer, tablet, smartphone, game console, etc.).

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for stream region replacement. The method 100 and/or a method 100 element or elements may be performed by an apparatus (e.g., electronic device, computing device, client device, etc.). For example, the method 100 may be performed by the client device 202 described in relation to FIG. 2.

A client device may send 102 a video feed from the client device to a host device. For instance, the client device may include an integrated image sensor or may be linked to an image sensor (e.g., camera, web cam, etc.). The client device may obtain (e.g., receive) the video feed from the image sensor. The video feed may include an image or images (e.g., video frame(s)). In some examples, the video feed may indicate a scene captured from or near the client device. In some examples, the client device may insert a watermark into the video feed to facilitate location detection (at the client device and/or host device). The client device may send 102 the video feed to the host device via a network(s). For instance, the client device may format, packetize, and/or compress the video feed to send 102 the video feed to the host device.

The host device may generate a stream including a region based on the video feed. In some examples, the stream may include an image(s) (e.g., frame(s)) of a virtualized operating environment. For instance, the stream may depict a virtual desktop. The stream may include a region (e.g., area). For instance, the region may be a portion (e.g., subset, section, rectangular area, etc.) of the image or the whole image of the stream. In some examples, the region may include an image(s) of the video feed. For instance, a frame of the stream may include a region that depicts a frame of the video feed. In some examples, the region may include a marker, placeholder, or indicator (e.g., solid color, Quick Response (QR) code, watermark, etc.) associated with the video feed. In some examples, the stream indicates a video conference interface including the region. For instance, the stream may depict a video conference interface (e.g., interface for a video conferencing application such as Microsoft Teams, GoToMeeting, Zoom, FaceTime, Google Hangouts, etc.). In some examples, the region may be a portion (or correspond to a portion) of the video conference interface that depicts a video feed from the client device. The host device may send the stream to the client device. For instance, the host device may format, packetize, and/or compress the stream to send the stream to the host device.

The client device may receive 104 a stream including a region from the host device. For instance, the client device may receive 104 the stream from the host device, where the stream includes the region based on the video feed. In some examples, the client device may deformat, depacketize, and/or decompress the stream received from the host device. In some examples, the region may depict a degraded version of the video feed. For instance, when the video feed is sent to the host device, utilized to generate the stream, and sent back to the client device, the resulting video may have reduced quality. For instance, the round trip communication may add latency and reduce quality (e.g., reduce sharpness, frame rate, etc.) due to compression.

The client device may replace 106 the region with the video feed. For instance, the client device may replace the region of the received stream with the video feed (e.g., the locally captured video feed). In some examples, the client device may replace pixels of the region of the stream with pixels (e.g., an image, frame, etc.) of the video feed locally obtained from the image sensor (e.g., web cam). For instance, the region (e.g., pixels) may be replaced with the local (e.g., most recent) frame from the video feed.

In some examples, the client device may render the stream with the video feed in the region. For instance, the client device may render the stream with the local video feed replacement of the region. Rendering may include generating an image based on data (e.g., stream data, pixel data, frame data, etc.). In some examples, the client device may display the stream. For instance, the client device may output the stream (e.g., image(s), frame(s), etc.) using a display device and/or a display panel. Replacing the region with the locally captured video feed may enhance the latency and/or quality of the stream. For instance, the replaced region may exhibit increased responsiveness (e.g., less latency) and/or quality (e.g., greater sharpness, resolution, and/or frame rate, etc.).

In some examples, the client device may determine a location of the region in the stream. For instance, upon receiving 104 the stream including the region, the client device may determine where the region is located in the stream (e.g., image, frame, etc.).

In some examples, determining the location may include searching the stream based on the video feed. For instance, the client device may utilize the local video feed (e.g., image(s) and/or frame(s) of the local video feed) to determine where the region is located in the stream (e.g., image(s) and/or frame(s) of the stream). In some examples, determining the location may include searching the stream for a watermark. For instance, the client device may search the stream for a watermark of the video feed. In some examples, the watermark may be imperceptible to a user.

In some examples, searching the stream may be based on a frame locally cached from the video feed. For instance, video frames from a local image sensor (e.g., web camera) may be cached locally to allow the client device to search the incoming pixel data from the host device for a region that matches a previously sent video frame. In some examples, the client device may utilize a frame from the local video feed and search the stream (e.g., a frame(s) of the stream from the host device) for similar content. For instance, the client device may scale a local frame to a scale(s) and determine whether the local frame is similar (e.g., has a threshold correlation and/or a similar feature(s)) to a window(s) at a location of the stream. If a section of the stream (e.g., section of a frame(s) of the stream) is similar to the local frame (e.g., meets a threshold correlation and/or has a similar feature(s)), the client may utilize the position of the section (and the size of the scale, for instance) as the location of the region. In some examples, the client device may perform a computer vision technique(s) (e.g., scale invariant feature transform (SIFT)) to determine the location of the region. In some examples, the client device may perform the search over multiple frames of the stream (e.g., ±m frames) to account for latency between the local video feed and the stream.

In some examples, the location of the region may be checked (e.g., periodically checked, checked every frame, checked in a frame per n frames, etc.). For instance, the search may be repeated, or another routine may be performed. For instance, once the location of the region in the stream has been determined, the search (which may relatively computationally expensive to perform, for instance) may be stopped or suspended. For instance, the search may be replaced by a routine to confirm that the determined location still corresponds to (e.g., maps to) a frame from the local video feed. For instance, the routine may include comparing data (e.g., pixels) from the previously determined location to a frame from the local video feed. In some examples, the comparison may include calculating a correlation measure, a difference measure, or another measure. If the measure satisfies a criterion (e.g., the correlation measure is above a threshold, the difference measure is below a threshold, etc.), the client device may confirm that the region is in the same location. If the measure does not satisfy the criterion, the client device may determine that the region is not in the same location (e.g., the region has moved or the region is no longer in the stream). In some examples, in a case that the client device determines that the region is not in the same location, the client device may search for the region again (e.g., perform SIFT or another computer vision technique). In some examples, if the search is unsuccessful for a threshold period, the client device may determine that the stream does not include a region based on the video feed.

In some examples, determining the location may be based on a location indication from the host device. For instance, the host device may produce a location indication that indicates the location of the region in the stream. For instance, the host device may perform a search (and/or check routine). In some examples, the host may cache the video feed (e.g., a frame(s) of the received video feed from the client device) and may perform the search on the generated stream based on the cached video feed (e.g., frame(s)). In some examples, the caching and/or search may be performed by the host device similarly to the description of caching and/or search given relative to the client device to produce the location indication. The location indication may be a marker, information (e.g., region position and size data), metadata, etc. The host device may send the location indication to the client device. In some examples, the search and/or location determination may be performed by the client device and/or by the host device.

In some examples, the host device may embed a location indication in the stream. For instance, the host device may embed a marker in the stream to indicate the location of the region. In some examples, the location indication (e.g., marker) may be a QR code, a solid color, a pattern, a bar code, etc. For instance, the host device may place the location indication in the region. For example, the host device may set pixels in the region to the location indication (e.g., marker, QR code, solid color, pattern, bar code, etc.). In some examples, the client device may be programmed to recognize the location indication (e.g., marker, solid color, QR code, pattern, bar code, etc.) embedded in the stream.

In some examples, determining the location may include searching the stream based on a location indication embedded in the stream. For instance, the client device may search the stream for the location indication (e.g., marker, QR code, solid color, pattern, bar code, etc.) to determine the location.

In some examples, the host device may send a location indication in a side channel. For instance, the host device may send information (e.g., region position and size information) indicating the location of the region in the stream.

In some examples, the side channel may be separate from the stream or may accompany the stream. In some examples, the host device may not send (e.g., skip sending) the region (e.g., pixel information for the region) in the stream. The client may be informed of the location to allow the client device to replace the region with the local video feed. In some examples, the host device may send the location indication to the client through a host Virtual Desktop Infrastructure (VDI) process.

In some examples, replacing the region with the video feed may be based on the location indication in the side channel from the host device. For instance, the client device may receive the location indication in the side channel and may replace the region in the location provided by the location indication. In some examples, operation(s), function(s), and/or element(s) of the method 100 may be omitted and/or combined.

Figure 2:
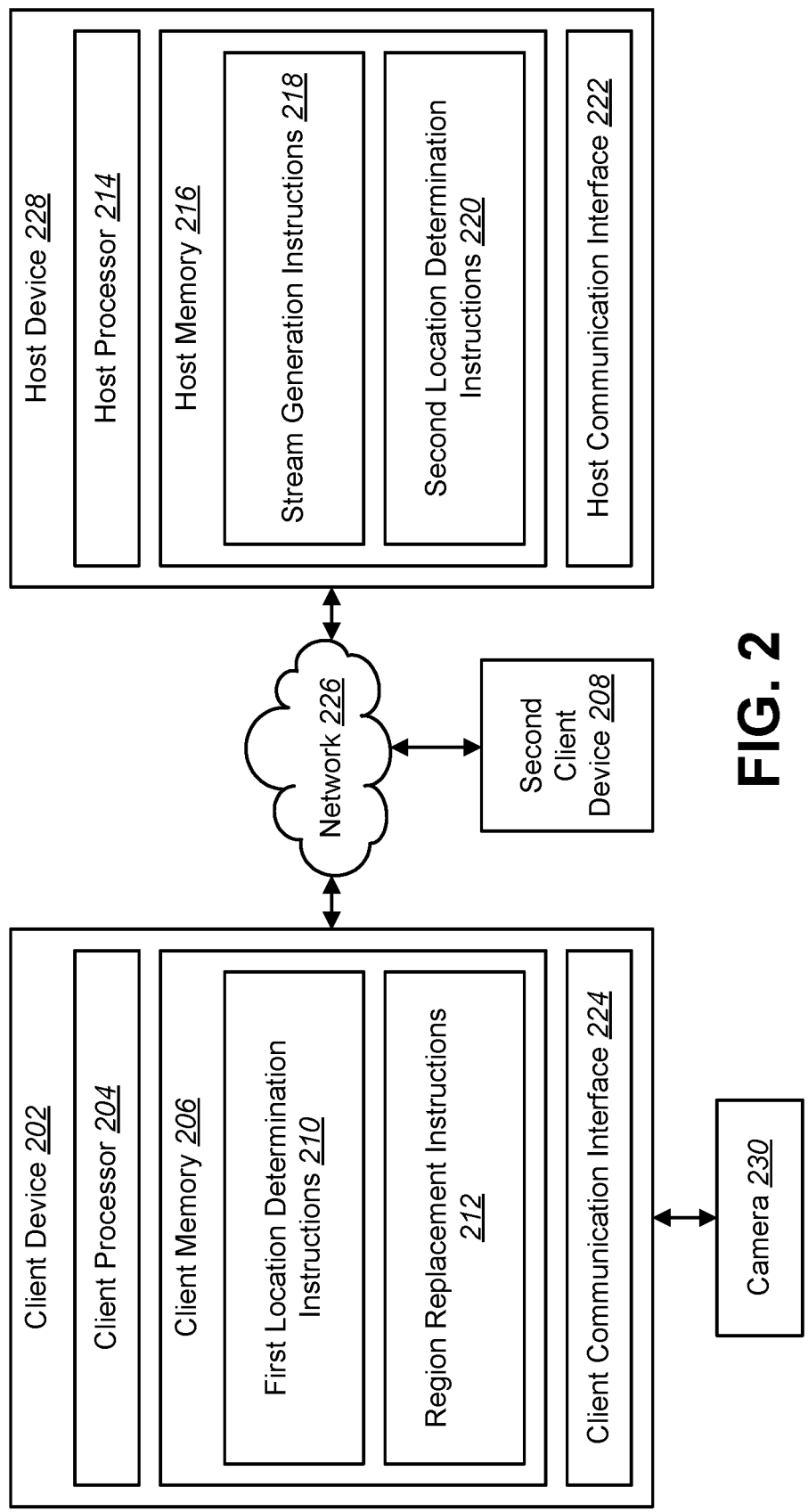
FIG. 2 is a block diagram of an example of a client device and a host device that may be used for stream region replacement.

FIG. 2 is a block diagram of an example of a client device 202 and a host device 228 that may be used for stream region replacement. The client device 202 may be a computing device, such as a personal computer, a laptop computer, tablet device, smartphone, etc. The client device 202 may include a client processor 204, a client memory 206, and/or a client communication interface 224. The client device 202 may include additional components (not shown) and/or some of the components described herein may be removed and/or modified without departing from the scope of this disclosure.

The client processor 204 may be any of a central processing unit (CPU), a digital signal processor (DSP), a semiconductor-based microprocessor, graphics processing unit (GPU), field-programmable gate array (FPGA), an application-specific integrated circuit (ASIC), and/or other hardware device suitable for retrieval and execution of instructions stored in the client memory 206. The client processor 204 may fetch, decode, and/or execute instructions stored in the client memory 206. In some examples, the client processor 204 may include an electronic circuit or circuits that include electronic components for performing a function or functions of the instructions. In some examples, the client processor 204 may perform one, some, or all of the operations, aspects, etc., described in relation to one, some, or all of FIGS. 1-4. For example, the client memory 206 may store instructions for one, some, or all of the operations, aspects, etc., described in relation to one, some, or all of FIGS. 1-4. The client processor 204 may be coupled to (e.g., may be in electronic communication with) the client memory 206.

The client memory 206 may be any electronic, magnetic, optical, or other physical storage device that contains or stores electronic information (e.g., instructions and/or data). The client memory 206 may be, for example, RAM, EEPROM, a storage device, an optical disc, and/or the like. In some examples, the client memory 206 may be volatile and/or non-volatile memory, such as DRAM, EEPROM, MRAM, PCRAM, memristor, flash memory, and/or the like. In some examples, the client memory 206 may be a non-transitory tangible machine-readable storage medium, where the term "non-transitory" does not encompass transitory propagating signals. In some examples, the client memory 206 may include multiple devices (e.g., a RAM card and a solid-state drive (SSD)). In some examples, the client memory 206 of the client device 202 may store first location determination instructions 210 and/or region replacement instructions 212.

In some examples, the client device 202 may include a client communication interface 224 through which the client processor 204 may communicate with an external device or devices (e.g., the host device 228). In some examples, the client device 202 may be in communication with (e.g., have a communication link with) the host device 228 and/or another device (e.g., a second client device 208) via a network 226. Examples of the host device 228 may include a computing device. Examples of the network 226 may include a local area network (LAN), wide area network (WAN), the Internet, cellular network, Long Term Evolution (LTE) network, 5G network, and/or a combination thereof, etc.

In some examples, the client device 202 (e.g., client processor 204) may utilize the client communication interface 224 to send and/or receive information. The client communication interface 224 may include hardware and/or machine-readable instructions to enable the client processor 204 to communicate with the host device 228 and/or another device(s). The client communication interface 224 may enable a wired and/or wireless connection to the host device 228 and/or another device(s) (e.g., the second client device 208, another device, etc.). In some examples, the client communication interface 224 may include a network interface card and/or may also include hardware and/or machine-readable instructions to enable the client processor 204 to communicate with the host device 228 and the second client device 208. In some examples, the client communication interface 224 may include hardware (e.g., circuitry, ports, connectors, antennas, etc.) and/or machine-readable instructions to enable the client processor 204 to communicate various input and/or output devices, such as a keyboard, a mouse, a display, another apparatus, electronic device, computing device, etc., through which a user may input instructions and/or data into the client device 202.

In some examples, the client device 202 may be connected to a camera 230 or may include a camera 230. For instance, the client device 202 may receive a video feed from the camera 230 (using the client communication interface 224, for instance). In some examples, the client device 202 may capture a video feed using an integrated camera 230.

In some examples, the host device 228 may be a server, cloud device, etc. In some examples, the host device 228 may include a host processor 214, host memory 216, and/or host communication interface 222. In some examples, the host memory 216 may be any electronic, magnetic, optical, or other physical storage device that contains or stores electronic information (e.g., instructions and/or data), such as, for example, RAM, ROM, a storage device, an optical disc, DRAM, EEPROM, MRAM, PCRAM, memristor, flash memory, and/or the like. In some examples, the host processor 214 may be any of a CPU, a DSP, a semiconductor-based microprocessor, GPU, FPGA, an ASIC, and/or other hardware device suitable for retrieval and execution of instructions stored in corresponding memory. In some examples, the host communication interface 222 may include hardware and/or machine-readable instructions to enable the host device 228 to communicate with the client device 202, with a second client device 208, and/or another device(s). Examples of the second client device 208 may include a computing device, desktop computer, laptop computer, tablet device, smartphone, etc.

In some examples, the client communication interface 224 may send a video feed to the host device 228. For instance, the client device 202 (e.g., client processor 204) may format and/or packetize the video feed from the camera 230 and send the video feed to the host device 228. The host device 228 (e.g., host communication interface 222) may receive the video feed. In some examples, the client device 202 (e.g., client processor 204 and/or client memory 206) may cache a frame(s) of the video stream. For instance, the frame(s) may be cached for subsequent use in determining a location of a region in a received stream.

In some examples, the host device memory 216 may include stream generation instructions 218 and/or second location determination instructions 220. The host processor 214 may execute the stream generation instructions 218 to generate a stream including a region based on the video feed received from the client device 202. For instance, the host device 228 (e.g., host processor 214) may generate a stream to send to the client device 202 and/or the second client device 208 (or separate streams to the client device 202 and second client device 208, for example). In some examples, generating the stream may be performed as described in relation to FIG. 1. For instance, the host processor 214 may execute the stream generation instructions 218 to generate a stream, where a portion or all of the stream indicates (e.g., depicts) a region based on the video feed (e.g., an image(s) or frame(s) of the video feed, a portion targeted for presentation of the video feed, a marker associated with the video feed, placeholder associated with the video feed, indicator associated with the video feed, etc.).

In some examples, the host device 228 (e.g., host processor 214) may produce a virtualized operating environment. For instance, the stream may indicate (e.g., depict) the virtualized operating environment. In some examples, the stream may indicate a video conference interface including the region. In some examples, the stream generation instructions 218 may include a video conferencing application to be executed in the virtualized operating environment. The host device 228 (e.g., host communication interface 222) may send the stream to the client device 202 via the network 226.

In some examples, the host memory 216 may include second location determination instructions 220. For instance, the host processor 214 may execute the second location determination instructions 220 to produce a location indication of the region. In some examples, the host device 228 (e.g., host processor 214) may produce the location indication of the region as described in relation to FIG. 1. For instance, the host device 228 (e.g., host processor 214) may cache a frame(s) of the received video feed and search the stream using a computer vision technique (e.g., SIFT) to determine the location of the region in the stream. In some examples, the host device 228 (e.g., host processor 214) may search the stream for a watermark.

In some examples, the location indication may be information (e.g., position, size, pixel range(s), etc.). In some examples, the location indication may be sent in a side channel. For instance, the host device 228 (e.g., host communication interface 222) may send the information in a side channel to the client device 202 (e.g., client communication interface 224). In some examples, the location indication may be embedded in the stream. For instance, the location indication (e.g., marker) may be a QR code, a solid color, a pattern, a bar code, etc., embedded in the stream. For instance, the host device 228 (e.g., host processor 214) may produce pixels of a location indication and embed the location indication (e.g., marker) at in the region. In some examples, the host communication interface 222 may send the stream and the location indication to the client device 202.

In some examples, the stream sent to the client device 202 may not include the video feed itself (e.g., image(s) and/or frame(s) of the video feed). For instance, the host device 228 may replace the video feed with the location indicator based on the video feed. For instance, the video feed itself may be omitted from the stream.

In some examples, the host device 228 (e.g., host communication interface 222) may omit the video feed from a first stream sent to the client device, and may include the video feed in a second stream sent to the second client device 208. For instance, the client device 202 may present video conferencing using the local video feed (for a first user), while the second client device 208 may present video conferencing using the video feed from the client device 202 relayed through the host device 228.

The client device 202 may receive the stream. For instance, the client communication interface 224 may receive the stream from the host device 228. The stream may include the region based on the video feed.

In some examples, the client processor 204 may execute the first location determination instructions 210 to determine a location of the region in the stream. In some examples, determining the location of the region in the stream may be performed as described in relation to FIG. 1. For instance, the client device 202 (e.g., client processor 204) may utilize a computer vision technique (e.g., SIFT) to determine the location of the region, may search the stream for a watermark, and/or may receive data from the host device 228 indicating the location of the region. In some examples, the client processor 204 may determine the location of the region based on a frame(s) (e.g., a frame(s) of the video feed cached in the client memory).

In some examples, the client device 202 and/or the host device 228 may perform location determination. For instance, the client device 202 (e.g., client processor 204) may perform location determination without a location determination performed by the host device 228 (where the second location determination instructions 220 may not be included, for example). In some examples, the host device 228 (e.g., host processor 214) may perform location determination without a location determination performed by the client device 202 (where the first location determination instructions 210 may not be included, for example). In some examples, both the client device 202 and the host device 228 may perform a location determination(s).

In some examples, the client processor 204 may execute the region replacement instructions 212 to replace the region with the video feed (e.g., local video feed from the camera 230). In some examples, replacing the region may be performed as described in relation to FIG. 1. In some examples, the client device 202 (e.g., client processor 204) may replace the region with a current image or frame (e.g., most recent image or frame) from the video feed of the camera 230.

In some examples, the client processor 204 may adjust a timing of the video feed to replace the region. For instance, the client processor 204 may replace the region with a previous image or frame (e.g., non-current image or frame) of the video feed. For example, the client processor 204 may determine a previous frame of the video feed that corresponds to the region in the stream. In some examples, the client device 202 may receive a timestamp or frame number from the host device 228 indicating the frame of the video feed that is included in the stream. The client device 202 may utilize the timestamp or frame number to select a previous image or frame from the video feed to replace the region (e.g., a frame with a same timestamp or frame number). In some examples, the client processor 204 may select a previous frame of the video feed that most closely matches (e.g., most highly correlates with) the region.

Adjusting the timing of the video feed may enable coordinating (e.g., synchronizing) the local video feed with the frame received from the host device 228 (e.g., a delayed frame). In some examples, adjusting the timing may allow a uniform video feed timing between client devices. For instance, the stream viewed at the client device 202 may have a same timing as the stream viewed at the second client device 208.

Figure 3:
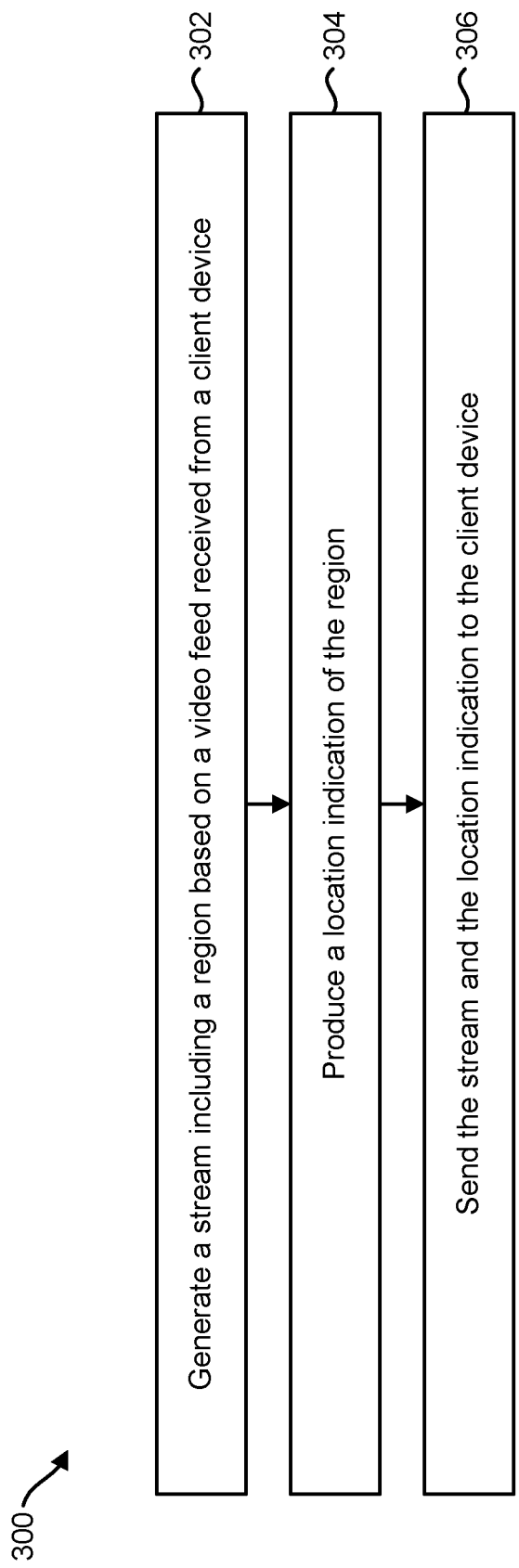
FIG. 3 is a flow diagram illustrating an example of a method for stream region replacement.

FIG. 3 is a flow diagram illustrating an example of a method 300 for stream region replacement. The method 300 and/or a method 300 element or elements may be performed by an apparatus (e.g., electronic device, computing device, client device, etc.). For example, the method 300 may be performed by the host device 228 described in relation to FIG. 2.

A host device may generate 302 a stream including a region based on a video feed from a client device. In some examples, generating 302 the stream may be performed as described in relation to FIG. 1 and/or FIG. 2.

The host device may produce 304a location indication of the region. In some examples, producing 304 the location indication may be performed as described in relation to FIG. 1 and/or FIG. 2.

The host device may send 306 the stream and the location indication to the client device. In some examples, sending 306 the stream and the location indication may be performed as described in relation to FIG. 1 and/or FIG. 2.

Figure 4:
FIG. 4 is a block diagram illustrating an example of a computer-readable medium for stream region replacement.

FIG. 4 is a block diagram illustrating an example of a computer-readable medium 440 for stream region replacement. The computer-readable medium is a non-transitory, tangible computer-readable medium 440. The computer-readable medium 440 may be, for example, RAM, EEPROM, a storage device, an optical disc, and/or the like. In some examples, the computer-readable medium 440 may be volatile and/or non-volatile memory, such as DRAM, EEPROM, MRAM, PCRAM, memristor, flash memory, and/or the like. In some examples, the client memory 206 described in relation to FIG. 2 may be an example of the computer-readable medium 440 described in relation to FIG. 4.

The computer-readable medium 440 may include data (e.g., instructions, executable code, application(s), program(s), and/or information). For example, the computer-readable medium 440 may include video feed instructions 442, stream reception instructions 444, and/or region replacement instructions 446.

The video feed instructions 442 may be executed by a processor to send a video feed from a client device to a host device. In some examples, sending the video feed may be performed as described in relation to FIG. 1 and/or FIG. 2.

The stream reception instructions 444 may be executed by a processor to receive a stream from the host device, where the stream includes a region based on the video feed. In some examples, receiving the stream may be performed as described in relation to FIG. 1 and/or FIG. 2.

The region replacement instructions 446 may be executed by the processor to replace the region with the video feed. In some examples, replacing the region with the video feed may be performed as described in relation to FIG. 1 and/or FIG. 2.

Some examples of the techniques described herein may enhance video feed performance for virtualized operating environment. For instance, by compositing a live locally captured video onto a received stream (rather than relying on a host device to render the video feed, for instance), the round-trip time delay for this information may be reduced or eliminated. Accordingly, video responsiveness may be enhanced as the interactive latency for the composited element may be reduced.

Some examples of the techniques described herein may enhance video quality. For instance, by compositing the locally captured video onto a received stream, artifacts resulting from compression and/or redistribution of the video feed back to the client device may be mitigated. This may enhance performance of a virtual operating environment by presenting higher quality video.

In some examples of the techniques described herein, where a client device and host device are aware that the client device can overlay the video feed sent to the host device on the stream from the host device, the host device may bypass sending the video feed back to the client device. By bypassing sending this information, a bandwidth saving between the host device and client device (e.g., from the host device to the client device) may be achieved. In some examples, the client device and/or the host device may communicate a message(s) indicating region locating and/or replacement capability, which may allow a client device and a host device to coordinate communication format (e.g., whether to embed a location indicator or not, whether to send and/or read a side channel for location indicator information, etc.).

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples of systems and methods are described herein, the systems and methods are not limited to the examples. Variations of the examples described herein may be implemented within the scope of the disclosure. For example, operations, aspects, and/or elements of the examples described herein may be omitted or combined.

What is claimed is:

1. A method, comprising:
sending a video feed from a client device to a host device, wherein the video feed is locally captured at the client device;
storing, at the client device, a local version of the video feed;
receiving, at the client device, a stream from the host device, wherein the stream includes a region including a depiction based on the video feed, wherein the depiction based on of the video feed is remotely generated at the host device;
determining, at the client device, a location of the region in the stream; and
rendering, at the client device, the local version of the video feed at the location of the region such that the local version of the video feed replaces the depiction based on the video feed.

2. The method of claim 1, wherein determining the location comprises searching the stream based on the video feed.

3. The method of claim 2, wherein searching the stream is based on a frame locally cached from the video feed.

4. The method of claim 1, wherein determining the location comprises searching the stream based on a location indication, wherein the location indication is embedded in the stream by the host device.

5. The method of claim 1, further comprising receiving, in a side channel from the host device, a location indication indicating a location of the region within the stream.

6. The method of claim 1, wherein the stream comprises an image of a virtualized operating environment.

7. The method of claim 1, wherein the stream indicates a video conference interface including the region.

8. A client device, comprising:
a communication interface to:
send a video feed to a host device, wherein the video feed is locally captured at the client device; and
receive a stream from the host device, wherein the stream includes a region depicting a representation of the video feed, wherein the representation of the video feed is remotely generated at the host device; and
a processor to:
prior to sending the video feed to the host device, cache a local version of the video feed in a memory of the client device;
determine, based on the video feed, a location of the region in the stream; and
render the local version of the video feed at the location of the region such that the local version of the video feed replaces the representation of the video feed.

9. The client device of claim 8, further comprising the memory to cache a frame of the video feed, and wherein the processor is to, after receipt of the stream from the host device, search the stream from the host device for the region, wherein the region is a portion of the stream that matches the frame of the video feed cached in the memory of the client device.

10. The client device of claim 8, wherein the processor is to adjust a timing of the video feed to replace the region.

11. The client device of claim 10, wherein, to adjust the timing of the video feed to replace the region, the processor is to
determine a previous frame of the video feed that corresponds to the representation of the video feed included in the region of the stream; and
replace the representation of the video feed included in the region of the stream with the previous image of the video feed, wherein the previous frame of the video feed was locally captured at the client device.

12. The client device of claim 11, wherein the processor is to utilize a timestamp or frame number to determine the previous frame.

13. The client device of claim 8, wherein the processor is to search incoming pixel data of the stream from the host device for a region that matches a previously sent video frame of the video feed.

14. The client device of claim 8, wherein the processor is to replace a first plurality of pixels included in the region of the stream with a second plurality of pixels of the video feed locally captured at the client device.

15. The client device of claim 8, wherein the depiction based on the video feed depicts a degraded version of the video feed relative to the local version of the video feed.

16. A host device, comprising:
a processor to:
generate, based on a video feed captured at and received from a client device, a stream including a region to include a representation of the video feed received from the client device; and
produce a location indication that indicates a location of the region within the stream; and
a communication interface to:
send the stream and the location indication to the client device, the client device to render the stream to include the local version of the video feed at the location such that the local version of the video feed replaces the representation of the video feed in the stream.

17. The host device of claim 16, wherein the processor is to embed the location indication in the stream prior to sending the stream and the location indication to the client device.

18. The host device of claim 17, wherein the host device embeds the location indication in the stream by setting a plurality of pixels in the region to the location indication.

19. The host device of claim 16, wherein the location indication is a watermark, wherein the watermark is imperceptible to a user.

20. The host device of claim 16, wherein the location indication includes a position, within the stream, of the region and a size of the region.

* * * * *